C. D. SMITH.

Steam-Boiler Furnace.

No. 8,750. Reissued June 10, 1879.

*Witnesses.*

J. A. Rutherford

James W. Wright Jr.

*Inventor.*

Charles D. Smith, per James L. Norris

Attorney.

N. PETERS, PHOTO-LITHOGRAPHER, WASHINGTON, D. C.

UNITED STATES PATENT OFFICE.

CHARLES D. SMITH, OF CHICAGO, ILLINOIS.

IMPROVEMENT IN STEAM-BOILER FURNACES.

Specification forming part of Letters Patent No. 155,896, dated October 13, 1874; Reissue No. 8,750, dated June 10, 1879; application filed February 14, 1879.

*To all whom it may concern:*

Be it known that I, CHARLES D. SMITH, of Chicago, in the county of Cook and State of Illinois, have invented certain new and useful Improvements in Steam-Boiler Furnaces, of which the following is a specification.

My invention consists in the combination, with a steam-boiler and furnace, of a coil of pipe arranged along the side of the boiler at or near the water-line, and having a pipe connected with the feed-water supply, while one end of said coil is connected with the water-space of the boiler and the other with the steam-space of the same, so that when the boiler is in operation a circulation is kept up in the coil, and water supplied to said coil by the feed device is heated before entering the boiler, thus greatly facilitating the generation of steam.

Figure 1:
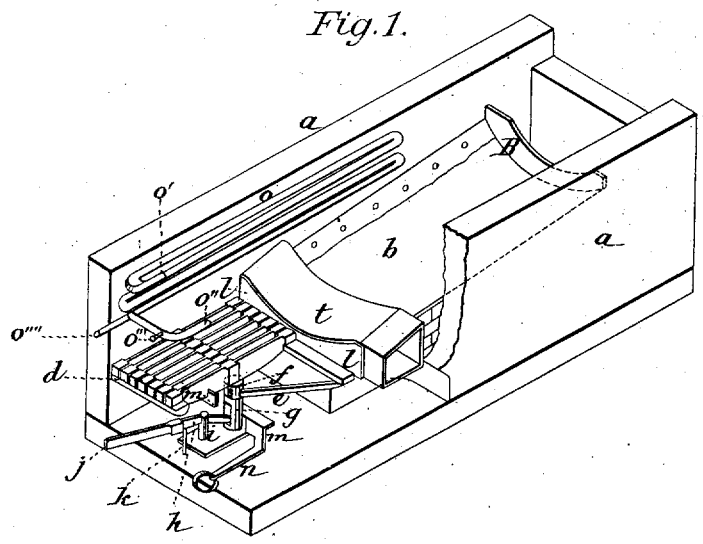
Figure 2:
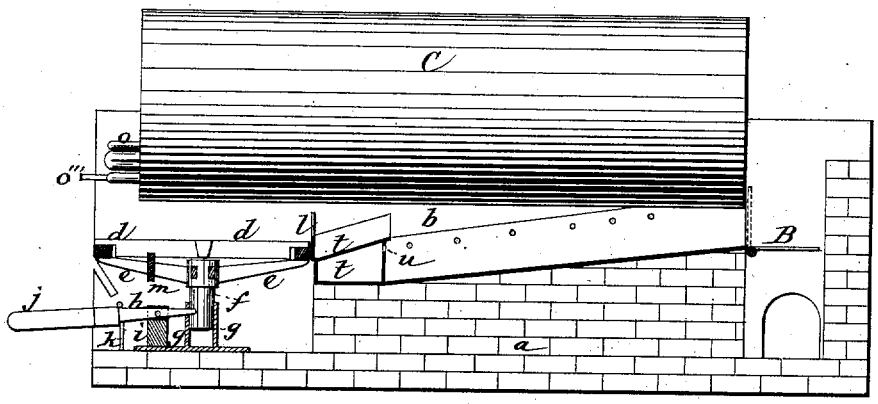

In the drawings, Figure 1 represents a perspective view of a furnace having connected therewith a feed-water heater constructed according to my invention. Fig. 2 represents a longitudinal section of the same, with a boiler, shown in full lines.

The walls of the furnace are represented by the letters *a a*, and the combustion-chamber by letters *b*. The boiler *c* is set longitudinally over the top of the furnace, as shown in Fig. 2. The grate is situated at the front of the furnace, as usual. On the inside of the furnace *a a* is arranged a coil or series of pipes, *o*, connected, as shown, by return-bends, and occupying a position to be subjected to the direct action of the furnace-heat; and said coil may be connected at $o''''$ to the device for supplying feed-water, and one end, $o''$, of the said coil may be connected to the water-space of the boiler, and the other, $o'$, to the steam-space, so that when the boiler is in operation a circulation is kept up in the coil, and water supplied to said coil by the feed device is heated before entering the boiler, thus greatly facilitating the generation of steam.

A valve, $o'''$, can be opened or closed to any desired extent to regulate the circulation in the coil.

The coil may rest upon any suitable support in proximity to the boiler.

The coil must be connected at both ends with the boiler, one end with the steam-space and the other end with the water-space, in order to form a circulation and carry the steam made by the coil into the boiler; otherwise the water would be driven out of the coil and the pipes burned out.

The form of grate shown, and which I prefer to use, consists of a series of bars, *d*, supported by a frame, *e*, carried by a standard, *f*, which slides in a hollow post, *g*, slotted on one side, as shown, to admit the end of a lever, *h*, which sets into a recess in the standard *f*, and serves to elevate and depress the same. This lever is pivoted to the upper end of a short standard, *i*, and is provided with a conveniently-shaped handle.

When the lever is depressed to elevate the grate it may be so held by a hooked rod, *k*, projecting from the hearth.

The grate may be provided with a shaking device, *m n*.

A hollow fire wall or bridge is represented at *t*, and may have at its ends suitable dampers or registers, (not shown in the drawings,) opening through the furnace-walls. The air passes from the hollow bridge *t* through passages *u* to the combustion-chamber.

While I prefer the arrangement of the grate and bridge as described for use in connection with my feed-water heater, of course other arrangements, which will be suggested by circumstances, may be used as well and with the same results.

What I claim is—

The combination, with a steam-boiler and furnace, of a coil of pipe arranged along the side walls of the boiler about or near the water-line, said coil having a pipe connected with the feed-water supply, and one end of the said coil connecting with the water-space of the boiler, while its other end connects with the steam-space of the boiler, substantially as described.

In testimony whereof I have hereunto set my hand in the presence of the subscribing witnesses.

CHAS. D. SMITH.

Witnesses:

EDWARD E. RICH,

WM. KELLY.